US012578774B2

(12) United States Patent
Dorsey et al.

(10) Patent No.: US 12,578,774 B2
(45) Date of Patent: Mar. 17, 2026

(54) MEMORY HIERARCHY POWER MANAGEMENT

(71) Applicant: Apple Inc., Cupertino, CA (US)

(72) Inventors: John G. Dorsey, San Francisco, CA (US); Bryan R. Hinch, Campbell, CA (US); Ronit Banerjee, Mountain View, CA (US); Karthic A. Palaniappan, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 115 days.

(21) Appl. No.: 18/468,467

(22) Filed: Sep. 15, 2023

(65) Prior Publication Data

US 2025/0093932 A1     Mar. 20, 2025

(51) Int. Cl.
G06F 1/00          (2006.01)
G06F 1/28          (2006.01)
(52) U.S. Cl.
CPC ...................................... G06F 1/28 (2013.01)
(58) Field of Classification Search
CPC ....................................................... G06F 1/28
See application file for complete search history.

(56) References Cited

U.S. PATENT DOCUMENTS

2006/0050637 A1* 3/2006 Wigard ................. H04W 28/12
                                                              370/252
2009/0049313 A1* 2/2009 Gooding ............... G06F 1/3203
                                                              713/300

2009/0049317 A1* 2/2009 Gara ....................... G06F 1/263
                                                              713/320
2016/0026479 A1    1/2016 Rosenzweig et al.
2020/0073714 A1* 3/2020 Venkataraman ...... G06F 1/3296
2020/0341533 A1* 10/2020 Ho ......................... G06F 1/3296
2021/0011860 A1* 1/2021 Nam ....................... G06N 3/063
2021/0100126 A1* 4/2021 Li ............................. G06F 1/28
2021/0157700 A1    5/2021 Dorsey et al.
2022/0229485 A1* 7/2022 Hsu ........................... G06F 1/26

OTHER PUBLICATIONS

International Search Report and Written Opinion of the International Searching Authority directed to International Patent Application No. PCT/US2024/46729, mailed Dec. 17, 2024; 12 pages.

* cited by examiner

*Primary Examiner* — Mohammed H Rehman
(74) *Attorney, Agent, or Firm* — Sterne, Kessler, Goldstein & Fox P.L.L.C.

(57) ABSTRACT

Some embodiments include a system, apparatus, method, and computer program product for memory hierarchy power management. Some embodiments include a performance controller that balances memory hierarchy power and compute power to maintain package-level power efficiency of a systems-on-a-chip (SoC)-memory package. The performance controller can determine a ratio of memory hierarchy power to compute agent power, compare the ratio against a threshold value, and based on the comparison, determine how to manage memory hierarchy power. When the energy costs of the memory hierarchy power are large relative to the energy costs of the compute agent power, some embodiments include changing a performance state of a fabric and/or memory to increase the power efficiency of the overall SoC-memory package, even though a number of memory stall cycles experienced by the compute agent may increase.

20 Claims, 6 Drawing Sheets

300

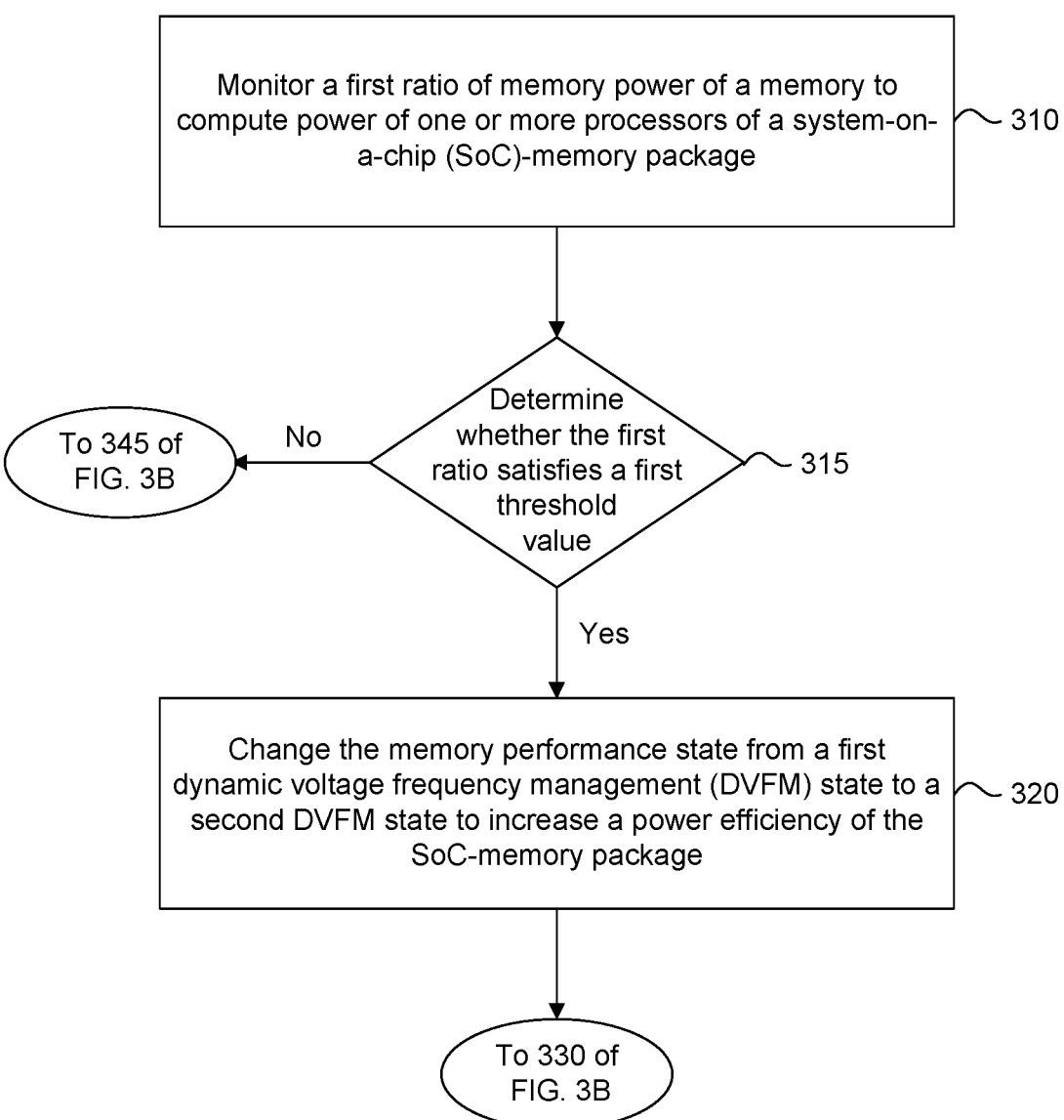

Monitor a first ratio of memory power of a memory to compute power of one or more processors of a system-on-a-chip (SoC)-memory package ⟋⟍ 310

Determine whether the first ratio satisfies a first threshold value ⟋⟍ 315

No → To 345 of FIG. 3B

Yes

Change the memory performance state from a first dynamic voltage frequency management (DVFM) state to a second DVFM state to increase a power efficiency of the SoC-memory package ⟋⟍ 320

MEMORY HIERARCHY POWER MANAGEMENT

BACKGROUND OF THE INVENTION

Field

The embodiments relate generally to power efficiency control of systems-on-a-chip (SOC) with high-performance memory subsystems.

BRIEF SUMMARY OF THE INVENTION

Some embodiments include a system, apparatus, method, and computer program product for memory hierarchy power management. Some embodiments include a performance controller that balances memory hierarchy power and compute power to maintain power efficiency of a systems-on-a-chip (SoC)-memory package.

Some embodiments include a SoC-memory package including a memory and one or more processors communicatively coupled to the memory via a fabric. The SoC-memory package can monitor a first ratio of memory power of the memory to compute power of the compute agent and determine that the first ratio satisfies a first threshold value. The SoC-memory package can change a memory performance state from a first memory dynamic voltage frequency management (DVFM) state to a second memory DVFM state, responsive to the determining the first ratio, where the compute agent experiences an increase in a number of memory stall cycles based at least on the second memory DVFM state, and where the changing the memory performance state increases a power efficiency of the SoC-memory package. In some embodiments, the changing occurs in a closed loop system and the monitoring is periodic. The monitoring can include digital power estimation of the memory power, the compute power, or a fabric power of the fabric.

The SoC-memory package can determine whether the compute power satisfies a first low power threshold value, and based at least on the determination with the first low power threshold, change the memory performance state from the second memory DVFM state to a third memory DVFM state, where the compute agent experiences a decrease in the number of memory stall cycles based at least on the third DVFM state.

The SoC-memory package can determine whether the compute power satisfies a first high power threshold value, and based at least on the determination with the first high power threshold value, change the memory performance state from the second memory DVFM state to a third memory DVFM state, where the compute agent experiences a decrease in the number of memory stall cycles based at least on the third memory DVFM state.

The SoC-memory package can also monitor a second ratio of fabric power of the fabric to the compute power and determine that the second ratio satisfies a second threshold value. The SoC-memory package can change a fabric performance state from a first fabric DVFM state to a second fabric DVFM state, responsive to the determining the second ratio, where the compute agent experiences an increase in the number of memory stall cycles based at least on the second fabric DVFM state, and where the changing the fabric performance state increases the power efficiency of the SoC-memory package.

The SoC-memory package can determine whether the compute power satisfies a second low power threshold value, and based at least on the determination with the second low power threshold, change the fabric performance state from the second fabric performance DVFM state to a third fabric DVFM state, where the compute agent experiences a decrease in the number of memory stall cycles based at least on the third fabric DVFM state.

The SoC-memory package can determine whether the compute agent satisfies a second high power threshold, and based at least on the determination with the second high power threshold value, change the fabric performance state from the second fabric performance DVFM state to a third fabric DVFM state, where the compute agent experiences a decrease in the number of memory stall cycles based at least on the third fabric DVFM state.

BRIEF DESCRIPTION OF THE DRAWINGS/FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

FIG. 3A illustrates an example method for memory hierarchy power management, according to some embodiments of the disclosure.

Figure 1A:
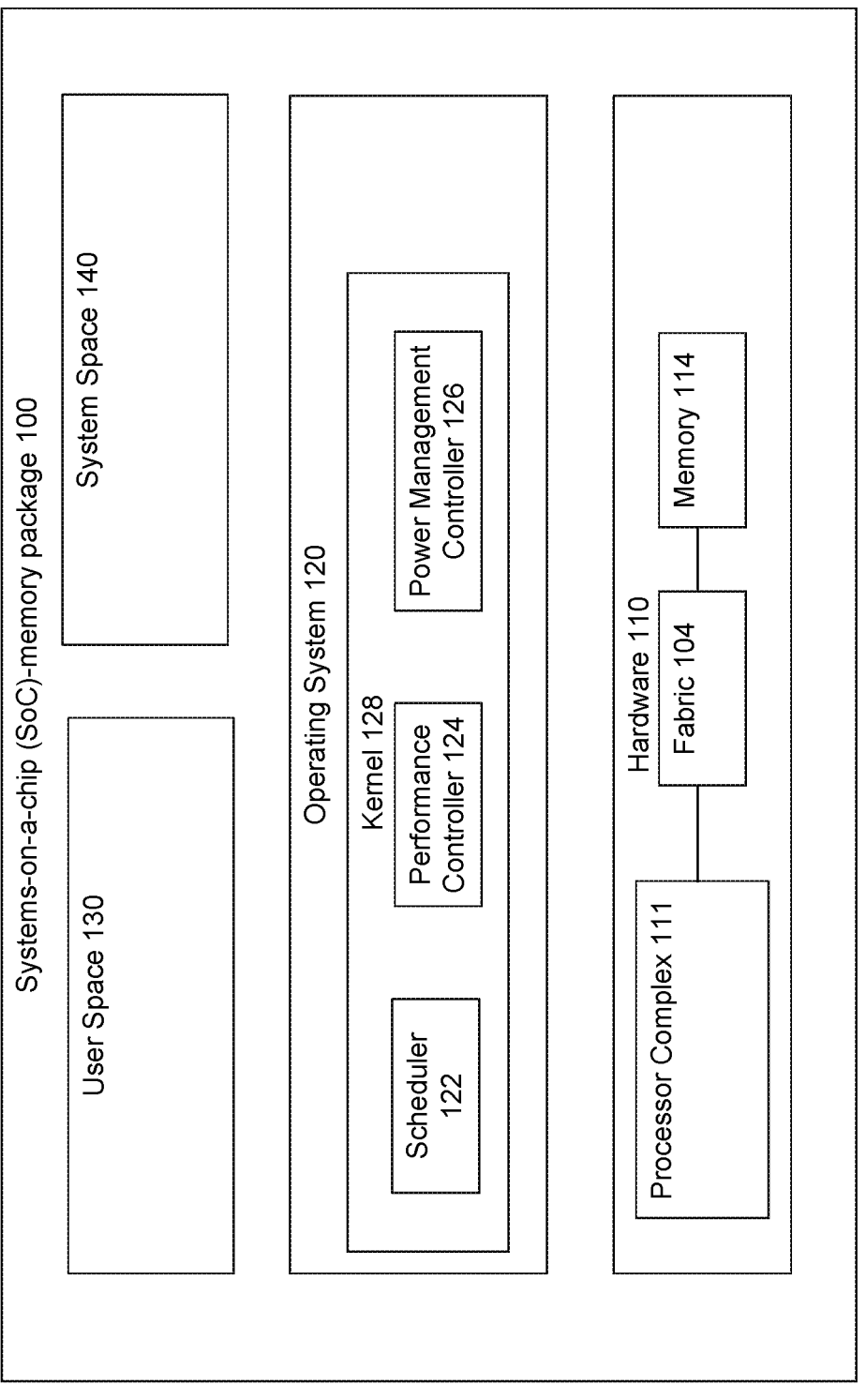
FIG. 1A illustrates an example system supporting memory hierarchy power management, in accordance with some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION OF THE INVENTION

Some embodiments include a system, apparatus, article of manufacture, method, and/or computer program product and/or combinations and sub-combinations thereof, for managing the energy costs of memory hierarchy for the purpose of improving power efficiency of systems-on-a-chip with high-performance memory subsystems (SoC-memory package.)

A challenge in the efficiency control of a SoC-memory package concerns the relationship between the compute agents, high-performance memory subsystems, and the fabric that interconnects the compute agents with the high-performance memory subsystems. Compute agents can include one or more of a Central Processing Unit (CPU), a Graphics Processing Unit (GPU), and/or a Neural Engine (NE) of the SoC-memory package. The high-performance memory subsystems can include caches, dynamic random access memory (DRAM), a DRAM control subsystem (DCS), and/or the fabric of the SoC-memory package. An example of a high-performance memory subsystem includes but is not limited to a low-power double data rate version 5 (LPDDR5).

In this disclosure, memory can refer to a combination of the DCS and the DRAM of the high-performance memory subsystems. The fabric can refer to a combination of cache and the fabric. The memory hierarchy can refer to a combination of the memory and the fabric. Mention of a compute agent in the disclosure can refer to one or more compute agents.

The compute agent, memory, and the fabric can operate in a number of performance states that provide different energy-performance tradeoffs. Generally, the faster a compute agent executes, the more likely the compute agent is to experience performance bottlenecks caused by delays in transactions with the memory hierarchy. These bottlenecks manifest as wasted opportunities to make forward progress in the workload; the bottlenecks can sometimes be referred to as memory stall cycles. During a memory stall cycle, a compute agent may wait (e.g., stalls) for data to be retrieved from the memory hierarchy. The SoC-memory package can include a performance controller of a compute agent that can choose to mitigate the bottleneck by increasing the performance of the memory hierarchy (e.g., by raising a performance state of the memory and/or the fabric) which increases the amount of energy dissipated in the SoC-memory package.

When the energy costs of the memory hierarchy of the SoC-memory package are small relative to the energy costs of the compute agent of the SoC-memory package, spending additional energy in the memory hierarchy increases the efficiency of the overall SoC-memory package. This occurs when the relative decrease in delay experienced by the compute agent outweighs the relative increase in energy spent on the memory hierarchy. An increase in the speed of the memory hierarchy (e.g., increase in the compute agent's access to data to and from the memory and/or the fabric) leads to improved performance-per-watt by reducing the volume of memory stall cycles at the compute agent.

A SoC-memory package may include advanced memory technologies such as LPDDR5 that offer higher peak throughputs at correspondingly higher energy costs. This higher available memory hierarchy performance is effective at reducing memory stall cycles, but the energy-performance tradeoff can become more complicated. It may no longer be the case that the relative decrease in delay experienced by the compute agent outweighs the relative increase in energy spent on the memory hierarchy, particularly at the fastest memory hierarchy performance states. The control system (e.g., a performance controller of the compute agent) responsible for selecting memory hierarchy performance states may choose to monitor the volume of memory stall cycles in the compute agents and increase memory hierarchy performance when the volume of stall cycles satisfies (e.g., exceeds) a threshold amount. Such a control system could determine that choosing a faster memory hierarchy performance state reduces the number of memory stall cycles. This observation is made from the perspective of the compute agent, considering compute agent performance and perhaps even compute agent energy dissipation. What the control system may lack is a comprehension of the energy costs of the memory hierarchy. Consequently, the control system may conclude that faster memory hierarchy performance is helpful in scenarios where the overall energy-performance tradeoff in the SoC-memory package is in fact, unfavorable.

Some embodiments include a system, method, and computer program product for managing the energy costs of memory hierarchy for the purpose of improving SoC-memory package-level efficiency (e.g., improving power efficiency of a SoC-memory package.) The memory hierarchy is supposed to act in a supporting role for the compute agent, so memory hierarchy energy usage should not be large in comparison to the energy spent by the compute agent. Some embodiments include monitoring power metrics for the various layers of memory hierarchy as well as the power metrics of the compute agent, and determining metrics such as a fabric-compute power ratio or a memory-compute power ratio. Some embodiments include controlling these ratios to tunable targets (e.g., threshold values) by managing memory hierarchy performance states in a closed-loop fashion. Thus, the embodiments enable higher memory hierarchy energy costs as compute agent energy increases, and manage the use of high memory hierarchy energy when the compute energy is low. As a result, the SoC-memory package-level performance-per-watt improves by avoiding the wasteful selection of more-energy expensive memory hierarchy performance states when the compute agents are executing in less-energy expensive configurations.

FIG. 1A illustrates an example system supporting memory hierarchy power management, in accordance with some embodiments of the disclosure. SoC-memory package 100 can be included in a computing device including but not limited to a computer, laptop, mobile phone, tablet, and personal digital assistant. SoC-memory package 100 can include hardware 110, operating system 120, user space 130, and system space 140. Hardware 110 can include processor complex 111, fabric 104, and memory 114.

In some embodiments, processor complex 111 includes the compute agents of SoC-memory package 100. Processor complex 111 may include a multiprocessing system having a plurality of CPU clusters, where each CPU cluster includes up to 4 independent processing units called CPU cores. Each CPU cluster includes uncore blocks that are separate from the CPU cores. Examples of uncore blocks include shared CPU cluster resources such as a matrix extension (MX) engine, a bus interface unit (BIU), and a last level cache (LLC). The CPU cores in a CPU cluster utilize the shared resources. Processor complex 111 can also include one or more GPUs and/or NEs.

When a plurality of CPU clusters include CPU cores of a same CPU core type, processor complex 111 can be considered a symmetric multiprocessing system (SMP). When at least one CPU cluster of the plurality of CPU clusters include CPU cores of a different type, processor complex 111 is considered an asymmetric multiprocessing system (AMP). Core types can include performance cores (P-core), efficiency cores (E-core), graphics cores, digital signal processing cores, and arithmetic processing cores. A P-core can have an architecture that is designed for very high throughput and may include specialized processing such as pipelined architecture, floating point arithmetic functionality, graphics processing, or digital signal processing. A P-core may consume more energy per instruction than an efficiency core. An E-core may consume less energy per instruction than a performance core. SoC-memory package 100 may include other hardware elements (not shown) of hardware 110.

Fabric 104 may also be referred to as memory fabric or memory fabric interconnect. Fabric 104 communicatively couples processor complex 111 with memory 114. In one or more implementations, the fabric 104 may be dynamically tunable. For example, the fabric 104 may operate at adjustable frequencies and/or voltage levels. In one or more implementations, different frequencies and/or voltage levels of fabric 104 may be mapped to different performance states for the fabric 104. A performance state can be a dynamic voltage frequency management (DVFM) state. The different performance states of the fabric 104 may be adaptively set and/or adjusted to control the performance of fabric 104, as is discussed further below.

Memory 114 can be any type of memory including dynamic random-access memory (DRAM), static RAM, read-only memory (ROM), flash memory, or other memory device. Storage can include hard drive(s), solid state disk(s), flash memory, USB drive(s), network attached storage, cloud storage, or other storage medium. In some embodiments, memory 114 can include a combination of the DCS and DRAM. A high-performance memory subsystems can include memory 114 and fabric 104. Memory 114 may be dynamically tunable. For example, the memory 114 may operate at adjustable frequencies and/or voltages. In one or more implementations, different frequencies and/or voltages of the memory 114 may be mapped to different performance states for the memory 114, such as different DVFM states. The different performance states of the memory 114 may be adaptively set and/or adjusted to control the performance of the memory 114, as is discussed further below.

Operating system 120 can include a kernel 128, scheduler 122, performance controller 124, power management controller 126 as well as operating system services (not shown.) Scheduler 122 can include interfaces to processor complex 111, and can include thread group logic that enables performance controller 124 to measure, track, and control performance of threads by thread groups. Performance controller 124 manages execution efficiency by understanding the performance needs of software workloads and configuring performance features of processor complex 111 to meet those needs. Performance controller 124 can include logic to receive sample metrics from scheduler 122, process the sample metrics per thread group, and determine a control effort needed to meet performance targets for the threads in the thread group. The sample metrics may be processed on the order of milliseconds (e.g., 2 msec, 4 msec.) Performance controller 124 can recommend a core type (e.g., P-type, E-type) and a DVFM state for processing threads of the thread group. Power management controller 126 can include logic to receive input regarding changing DVFM states of fabric 104 and/or memory 114, from performance controller 124 as well as other controllers (not shown) of SoC-memory package 100, and determines corresponding DVFM states for fabric 104 and/or memory 114.

User space 130 can include one or more application programs and one or more work interval object(s). System space 140 can include processes such a launch daemon and other daemons not shown (e.g. media service daemon and animation daemon.) Communications can occur between kernel 128, user space 130 processes, and system space 140 processes.

In some embodiments, performance controller 124 balances memory hierarchy power (e.g., fabric 104 power and/or memory 114 power) with compute agent power (e.g., processor complex 111 power) to maintain overall power efficiency of SoC-memory package 100. For example, performance controller 124 can determine a ratio of memory hierarchy power to compute agent power, compare the ratio against a threshold value, and based on the comparison, determine how to manage memory hierarchy power. When the energy costs of the memory hierarchy power are small relative to the energy costs of the compute agent power, spending additional energy on the memory hierarchy power increases the power efficiency of the overall SoC-memory package 100. This occurs when the relative decrease in delay (e.g., decrease in a number of memory stall cycles) experienced by the compute agent (e.g. processor complex 111) outweighs the relative increase in energy spent on the memory hierarchy (e.g., memory 114 and/or fabric 104.) When the energy costs of the memory hierarchy power are large relative to the energy costs of the compute agent power, spending additional energy on the memory hierarchy power can decrease the power efficiency of the overall SoC-memory package 100. In other words, the relative decrease in delay experienced by the compute agent does not outweigh the relative increase in energy spent on the memory hierarchy, particularly at the faster memory hierarchy performance states (e.g., higher valued DVFM states of fabric 104 and/or memory 114.)

When a ratio of memory hierarchy power to compute agent power exceeds a threshold, performance controller 124 can change the memory hierarchy power usage to maintain overall power efficiency of SoC-memory package 100. In other words, a performance state of memory 114 and/or fabric 104 can be lowered to maintain overall power efficiency of SoC-memory package 100, even though processor complex 111 may experience an increased number of memory stall cycles. To cause a change in a memory 114 DVFM state and/or fabric 104 DVFM state, performance controller 124 can send a message to power manager controller 126 that includes a corresponding DVFM state that is lower than a current DVFM state.

When a ratio of memory hierarchy power to compute agent power does not exceed a threshold, performance controller 124 can change the memory hierarchy performance (e.g., memory hierarchy power usage) to support the compute agent performance (e.g., compute agent power usage) and maintain overall power efficiency of SoC-memory package 100. For example, a performance state (e.g., DVFM state) of memory 114 and/or fabric 104 can be increased to support an increased performance state of processor complex 111 where processor complex 111 may experience a reduction in a number of memory stall cycles.

If for example, processor complex 111 is operating with a low compute agent power (e.g., in at least a given low DVFM state), then performance controller 124 may enable the memory hierarchy performance (e.g., DVFM state of memory 114 and/or DVFM state of fabric 104) to be adjusted (e.g., change to an increased DVFM state) to support processor complex 111 performance. Also, if processor complex 111 is operating with high compute agent power (e.g., in at least a given high DVFM state), then performance controller 124 may also enable the memory hierarchy performance to be adjusted to support processor complex 111 performance.

Figure 1B:
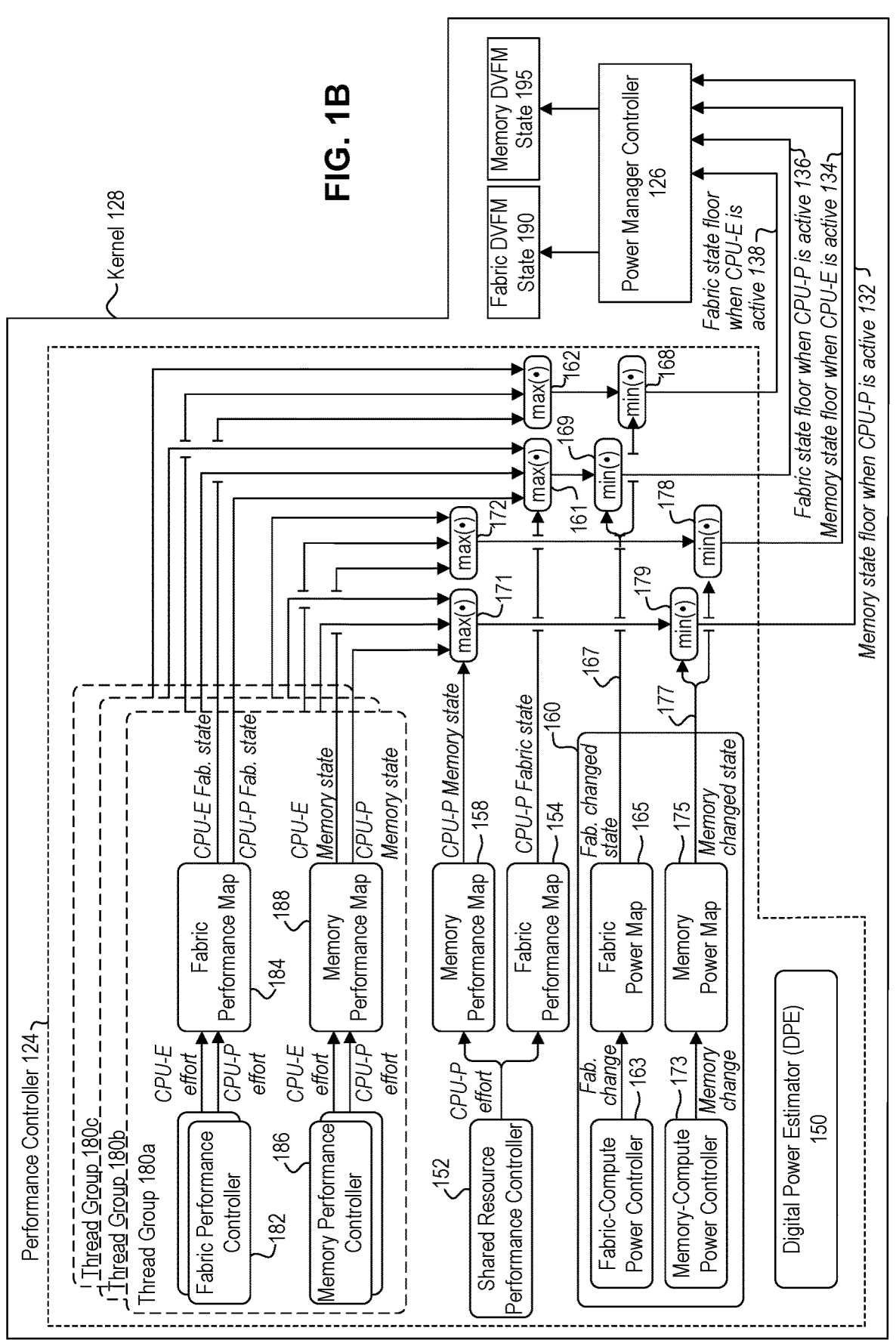
FIG. 1B illustrates an example performance controller supporting memory hierarchy power management, in accordance with some embodiments of the disclosure.

FIG. 1B illustrates example performance controller 124 supporting memory hierarchy power management, in accordance with some embodiments of the disclosure. As a convenience and not a limitation, FIG. 1B may be described with reference to elements from other figures in the disclosure. For example, performance controller 124 of FIG. 1B can include additional details of the same performance controller 124 of FIG. 1A.

To determine a ratio of memory hierarchy power to compute agent power, performance controller 124 can include digital power estimator (DPE) 150 and memory hierarchy power management 160. DPE 150 can monitor and determine the memory power of memory 114, a fabric power of fabric 104, and the compute power of the compute agent (e.g., processor complex 111). In some embodiments, DPE 150 periodically monitors the memory power of memory 114, the compute power of processor complex 111, and/or a fabric power of fabric 104.

Memory hierarchy power management 160 can include fabric-compute power controller 163 and memory-compute power controller 173 that utilize the power measurements of DPE 150 to determine a fabric-compute power ratio as well as a memory-compute power ratio, respectively. For example, a fabric-compute power ratio can be calculated as (fabric power of fabric 104)/(compute power of processor complex 111.) The memory-compute power ratio can be calculated as (memory of memory 114)/(compute power of processor complex 111.)

Fabric-compute power controller 163 can compare the fabric-compute power ratio against a threshold value, and based on the comparison, determine how to manage a DVFM state of fabric 104. When the threshold value is satisfied (e.g., exceeded), fabric-compute power controller 163 transmits a signal to fabric power map 165 to change from a current DVFM state to a lower DVFM state. Thus, the output of fabric power map 165 can be fabric changed state 167 that includes the lower DVFM state of fabric 104. When the threshold value not satisfied (e.g., fabric-compute power ratio is at or below the threshold value), fabric-compute power controller 163 does not transmit a signal to fabric power map 165.

Memory-compute power controller 173 can compare the memory-compute power ratio against a threshold value (that can be different than that used with the fabric-compute power ratio), and based on the comparison, determine how to manage the DVFM state of memory 114. When the threshold value is satisfied (e.g., exceeded), memory-compute power controller 173 transmits a signal to memory power map 175 to change from a current DVFM state to a lower DVFM state. Thus, the output of memory power map 175 can be memory changed state 177 that includes the lower DVFM state of memory 114. When the threshold value not satisfied (e.g., memory-compute power ratio is at or below the threshold value), memory-compute power controller 173 does not transmit a signal to memory power map 175. In some embodiments, fabric-compute power controller 163 and/or memory-compute power controller 173 can utilize a proportional integral limiter, and when a corresponding threshold value regarding a ratio power is satisfied, the message can indicate a change from a current DVFM state to a lower DVFM state to maintain a package efficiency of SoC-memory package 100.

Figure 2:
FIG. 2 illustrates an example of memory power management, according to some embodiments of the disclosure.
Figure 2:

FIG. 2 illustrates example 200 of memory power management, according to some embodiments of the disclosure. As a convenience and not a limitation, FIG. 2 may be described with reference to elements from other figures in the disclosure. For example, default signal 210 may represent a default performance of SoC-memory package 100 without consideration of a memory-compute power ratio determined by memory-compute power controller 173 and memory power map 175 of FIG. 1B (or memory hierarchy power management 160 of FIG. 1B.) Memory power managed signal 220 may represent a performance of SoC-memory package 100 using memory-compute power controller 173 and memory power map 175. Memory Vmax 230 can represent maximum DVFM states of memory 114 (e.g., DRAM and DCS), and memory Vmin 240 can represent minimum DVFM states of memory 114 during operation of SoC-memory package 100. Increasing efficiency 250 represents the direction for improving power efficiency of SoC-memory package 100.

Example illustrates that default signal 210 operating within the boundaries of memory Vmin 240 and memory Vmax 230 can experience an increase in power usage (wattage) as performance increases. For example, sample 210e occurs at a higher performance level and a higher power level than sample 210f. Likewise, sample 210d occurs at a higher performance level and a higher power level than sample 210e. Similar performance level and power levels occur for samples 210a-210c. Some embodiments include managing memory 114 power via memory-compute power controller 173 and memory power map 175 that can reduce power usage with a tolerable reduction in performance illustrated by memory power managed signal 220. For example, when memory-compute power controller 173 determines that memory-compute power ratios corresponding to samples 210a-210f satisfy respective threshold values, memory-compute power controller 173 and memory power map 175 can cause an increase in power efficiency of SoC-memory package 100. The increase in power efficiency can include a change from a current DVFM state to a lower DVFM state that can result in processor complex 111 experiencing an increase in a number of memory stall cycles. For example, effects of implementing memory-compute power controller 173 and memory power map 175 can be seen in the shift from default signal 210 to memory power managed signal 220 as samples 210a-210f that satisfy respective threshold values transition to samples 220a-220f at correspondingly lower power levels and lower (albeit acceptable) performance levels, to obtain an increase in SoC-memory package power efficiency.

In some embodiments, when a processor complex 111 operates at or below a low power threshold, represented by sample 260 of example 200. When the low power threshold has been satisfied, performance controller 124 may disregard memory hierarchy power management 160. Accordingly, memory changed state 177 (and/or fabric changed state 167) signal do not contribute to the input to power manager controller 126. In some examples, performance controller 124 can cause fabric-compute power controller 163 to output a signal such as all zeros to fabric power map 165 and/or cause memory-compute power controller 173 to output all zeros to memory power map 175. In other words, performance controller 124 allows memory and/or fabric performance states to adjust according to the demands of processor complex 111 depicted as samples 262 and 264.

In some embodiments, when processor complex 111 operates above a high power threshold represented by 270 of example 200. When the high power threshold has been satisfied, performance controller 124 may disregard memory hierarchy power management 160. Accordingly, memory changed state 177 (and/or fabric changed state 167) signal does not contribute to the input to power manager controller 126. In other words, performance controller 124 allows memory performance states to adjust according to the demands of processor complex 111 depicted as samples 210g and 210h that satisfy the high power threshold of 270, transition to samples 220g and 220h respectively, adjusting to the demands of processor complex 111.

Although not shown, a similar increase in SoC-memory package power efficiency can be achieved with fabric power management using fabric-compute power controller 163 and fabric power map 165. Further, an analogous increase in SoC-memory package 100 power efficiency can be achieved with a combination of memory power management and fabric power management (memory hierarchy power management) in SoC-memory package 100 power efficiency.

Returning to FIG. 1B, performance controller 124 includes performance controllers such as fabric performance controller 182, memory performance controller 186, and shared resource performance controller 152, that can determine when a compute agent experiences a number of memory stall cycles that can be reduced by increasing a performance state (e.g., DVFM state) of fabric 104 and/or memory 114.

Fabric performance controller 182 can determine when a compute agent (e.g., processor complex 111) experiences a performance bottleneck due to fabric 104 performance. Note that fabric performance controller 182 can include more than one fabric performance controller (e.g., one for CPU clusters with E-cores and another for CPU clusters with P-cores.) For example, fabric performance controller 182 can determine a number of memory stall cycles that a CPU cluster with P-cores experiences when processing thread group 180*a*. If the number of memory stall cycles satisfies a threshold value (e.g., exceeds a threshold value), fabric performance controller 182 can transmit that information to fabric performance map 184 that determines an increased DVFM state for fabric 104 based on thread group 180*a*.

Fabric performance controller 182 can also determine a number of memory stall cycles that a CPU cluster with E-cores experiences when processing thread group 180*a*. If the number of memory stall cycles satisfies a threshold value (e.g., exceeds a threshold value), fabric performance controller 182 can transmit that information to fabric performance map 184 that determines an increased DVFM state for fabric 104 for the CPU cluster with E-cores based on thread group 180*a*. The values of the thresholds for the CPU cluster with P-cores may be lower than the threshold values corresponding to the CPU cluster with E-cores to enable a higher performance of the CPU cluster with P-cores. The CPU cluster with E-cores may be able to incur a higher number of memory stall cycles to attain a higher efficiency performance. In some examples, memory stall cycles of a CPU cluster with E-cores can be ignored and do not result in an increase in memory hierarchy performance states. Performance controller 124 can perform analogous controller functions for thread groups 180*b* and 180*c* (not shown.)

Memory performance controller 186 can determine when a compute agent (e.g., processor complex 111) experiences a performance bottleneck due to memory 114 performance. Note that memory performance controller 186 can include more than one memory performance controller (e.g., one for CPU clusters with E-cores and another for CPU clusters with P-cores.) For example, memory performance controller 186 can determine a number of memory stall cycles that a CPU cluster with P-cores experiences when processing thread group 180*a*. If the number of memory stall cycles satisfies a threshold value (e.g., exceeds a threshold value), memory performance controller 186 can transmit that information to memory performance map 188 that determines an increased DVFM state for memory 114 based on thread group 180*a*.

Memory performance controller 186 can also determine a number of memory stall cycles that a CPU cluster with E-cores experiences when processing thread group 180*a*. If the number of memory stall cycles satisfies a threshold value (e.g., exceeds a threshold value), memory performance controller 186 can transmit that information to memory performance map 188 that determines an increased DVFM state for memory 114 for the CPU cluster with E-cores based on thread group 180*a*. The values of the thresholds for the CPU cluster with P-cores may be lower than threshold values corresponding to the CPU cluster with E-cores to enable a higher performance of the CPU cluster with P-cores. The CPU cluster with E-cores may be able to incur a higher number of memory stall cycles to attain a higher efficiency performance. Performance controller 124 can perform analogous controller functions for thread groups 180*b* and 180*c*.

Shared resource performance controller 152 can include logic to measure a number of memory stall cycles experienced by the compute agent (e.g., processor complex 111) due to usage of shared resources (e.g., MX engine, BIU, and/or LLC). For example, shared resource performance controller 152 can determine that CPU cluster(s) with P-cores experience number of memory stall cycles when queues of the various shared resources are filled which can cause a bottleneck for processor complex 111 as compute agents (e.g., CPU cluster(s) with P-cores) experience memory stall cycles waiting for data from the shared resources. When shared resource performance controller 152 determines that the number of memory stall cycles corresponding to the shared resources satisfies a threshold (e.g., exceeds a threshold value), shared resource performance controller 152 can transmit information to memory performance map 158 and/or fabric performance map 154 to increase corresponding memory 114 and/or fabric 104 DVFM states. Thus, increasing the performance state of fabric 104 and/or memory 114 can reduce the number of memory stall cycles experienced by processor complex 111 due to shared resources (e.g., filled shared resource queues.)

Performance controller 124 can manage the performance requests to increase memory hierarchy performance states (e.g., performance requests output from fabric performance map 184, memory performance map 188, memory performance map 158, and/or fabric performance map 154) to balance memory hierarchy power with computer agent power to maintain power efficiency of SoC-memory package 100 by including outputs from DPE 150 and memory hierarchy power management 160 described below.

As shown in FIG. 1B, signals output from the following performance map functions can include DVFM states that are higher than the corresponding current DVFM states, and the signals can be input to function 171 (e.g., a maximum function): memory performance map 188 for CPU clusters with P-cores for thread group 180*a*; corresponding memory performance maps for CPU clusters with P-cores for thread groups 180*b* and 180*c*; and output from memory performance map 158. Function 171 can choose the maximum DVFM state from the input DVFM states. A parallel function 172 can be performed for CPU clusters with E-cores for thread groups 180*a*-180*c*.

Signals output from the following performance map functions can include DVFM states that are higher than the corresponding current DVFM states, and the signals can be input to function 161 (e.g., a maximum function): fabric performance map 184 for CPU clusters with P-cores for thread group 180*a*; corresponding fabric performance maps for CPU clusters with P-cores for thread groups 180*b* and 180*c*; and output from fabric performance map 154. Function 161 can choose the maximum DVFM state from the input DVFM states. A parallel function 162 can be performed for CPU clusters with E-cores for thread groups 180*a*-180*c*.

The output from functions 171 and 161 can increase the DVFM states of fabric 104 and/or memory 114 to minimize the number of memory stall cycles experienced by processor complex 111. In some examples, however, the increased energy expenditure from increasing the DVFM states of the memory 114 and/or fabric 104 can reduce the power efficiency of SoC-memory package 100 as shown by default signal 210 of FIG. 2. In other words, there are times when the power efficiency of SoC-memory package 100 can be improved by reducing the DVFM states of the memory 114 and/or fabric 104, resulting in an increased number of memory stall cycles experienced by processor complex 111 as shown by memory power managed signal 220 of FIG. 2.

To improve the power efficiency of SoC-memory package 100, performance controller 124 can collect the output of function 171 and the memory changed state 177 (output of memory power map 175) at function 179 (a minimum function). Function 179 can select the minimum DVFM state and output the selection as memory state floor when CPU-P is active 132. A similar function 178 can receive the output of function 172 and memory changed state 177, and make a selection of the minimum DVFM state for CPU clusters with E-cores. Function 178 can output the selection as memory state floor when CPU-E is active 134.

Performance controller 124 can collect the output of function 161 and the fabric changed state 167 (output of fabric power map 165) at function 169 (a minimum function). Function 169 can select the minimum DVFM state and output the selection as fabric state floor when CPU-P is active 136. Similarly, performance controller 124 can collect the output of function 162 and the fabric changed state 167 (output of fabric power map 165) at function 168 (a minimum function) and a selection can be made for CPU clusters with E-cores, output as fabric state floor when CPU-E is active 138. The outputs from the various minimum functions below can be input to power manager controller 126: memory state floor when CPU-P is active 132, memory state floor when CPU-E is active 134, fabric state floor when CPU-P is active 136, and/or fabric state floor when CPU-E is active 138.

Power manager controller 126 can receive the outputs from the various minimum functions of performance controller 124 that make requests regarding memory 114 and/or fabric 104, and can select an appropriate (e.g., another or a second) DVFM state for fabric 104 and/or an appropriate DVFM state for memory 114 that are output as fabric DVFM state 190 and/or memory DVFM state 195. Fabric DVFM state 190 and memory DVFM state 195 cause changes in the corresponding DVFM state of fabric 104 and the corresponding DVFM state of memory 114 based on the values determined by power manager controller 126, resulting in an increased power efficiency of SoC-memory package 100.

In other words, the memory DVFM state 195 may increase or decrease to a second DVFM state (e.g., using different memory power) of memory 114. Memory DVFM state 195 can include a second DVFM state that is lower than the first DVFM state. In an example, the second DVFM state of memory 114 can be different than a DVFM state included in memory changed state 177. In some embodiments, performance controller 124 operates as a closed loop system and the second DVFM state of memory 114 can be reflected in a subsequent output of DPE 150.

The fabric DVFM state 190 causes a change in the DVFM state of fabric 104 to a second DVFM state (which can be different than the second DVFM state of memory 114.) In other words, the fabric DVFM state 190 may increase or decrease to the second DVFM state (e.g., using different fabric power) of fabric 104. Fabric DVFM state 190 can include the second DVFM state that is lower than the first DVFM state of fabric 104. In an example, the second DVFM state of fabric 104 can be different than a DVFM state included in fabric changed state 167. In some embodiments, performance controller 124 operates as a closed loop system and the second DVM state of fabric 104 can be reflected in a subsequent output of DPE 150.

In some embodiments, DPE 150 periodically monitors the memory power based on the second DVFM state of memory 114 and/or fabric power based on the second DVFM state of fabric 104 that may have been changed (e.g., to corresponding lower DVFM states) due to fabric DVFM state 190 and/or memory DVFM state 195, resulting in an increased power efficiency of SoC-memory package 100.

In some embodiments, when processor complex 111 is operating with low compute agent power (e.g., in at least a given low DVFM state), performance controller 124 may enable the memory hierarchy performance (e.g., DVFM state of memory 114 and/or DVFM state of fabric 104) to be adjusted to support processor complex 111 performance. See sample 260 of FIG. 2. In other words, performance controller 124 may disregard the results of fabric-compute power controller 163 and/or memory-compute power controller 173. See sample 270 of FIG. 2. Thus, the outputs from the maximum functions (e.g., functions 161, 171, etc.) are input to power manager controller 126. Accordingly, the DVFM states of fabric 104 and/or memory 114 can increase to a level higher than the corresponding current DVFM states.

In some embodiments, when processor complex 111 is operating with high compute agent power (e.g., in at least a given high DVFM state), then performance controller 124 may also enable the memory hierarchy performance to be adjusted to support processor complex 111 performance as described above. In some examples, a combination of the memory-compute ratio, fabric-compute ratio, the low compute agent power and/or the high compute agent power can be used to determine whether to enable the memory hierarchy power management 160.

FIG. 3A illustrates example method 300 for memory hierarchy power management, according to some embodiments of the disclosure. As a convenience and not a limitation, FIG. 3A may be described with reference to elements from other figures in the disclosure. For example, method 300 can be performed by performance controller 124 and/or power management controller 126 of FIGS. 1A and 1B, and perform functions resulting in example 200 of FIG. 2.

At 310, performance controller 124 can monitor a first ratio of memory power of memory 114 to compute power of processor complex 111 of SoC-memory package 100. Memory hierarchy power management 160 can include memory-compute power controller 173 that utilizes the power measurements of DPE 150 to determine a memory-compute power ratio. For example, memory-compute power ratio can be calculated as (memory of memory 114)/(compute power of processor complex 111.)

At 315, performance controller 124 can determine whether the first ratio satisfies a first threshold value. For example, memory-compute power controller 173 can compare the memory-compute power ratio against a threshold value (that can be different than that used with the fabric-compute power ratio), and based on the comparison, determine how to manage the DVFM state of memory 114. When the first ratio satisfies a first threshold value (e.g., exceeds the first threshold value), method 300 proceeds to 320. Otherwise, method 300 proceeds to 345 of FIG. 3B.

At 320, performance controller 124 and power manager 126 can change the memory performance state from a first dynamic DVFM state to a second DVFM state to increase a power efficiency of the SoC-memory package 100. Memory-compute power controller 173 may transmit a signal to memory power map 175 to change from a current DVFM state to a lower DVFM state. Memory power map 175 may select a lower DVFM state for memory 114 accordingly. Thus, the output of memory power map 175 can be memory changed state 177 that includes the lower DVFM state of memory 114.

To improve the power efficiency of SoC-memory package 100, performance controller 124 can collect the output of function 171 and the memory changed state 177 (output of memory power map 175) at function 179 (a minimum function) as shown in FIG. 1B. Function 179 can select the minimum DVFM state and output the selection as memory state floor when CPU-P is active 132. A similar function 178 can receive the output of function 172 and memory changed state 177, and make a selection of the minimum DVFM state for CPU clusters with E-cores. Function 178 can output the selection as memory state floor when CPU-E is active 134.

Power manager controller 126 may receive the outputs from the various minimum functions of performance controller 124 that make requests regarding memory 114: memory state floor when CPU-P is active 132 and/or memory state floor when CPU-E is active 134. Based on the requests received, power manager controller 126 can select an appropriate second DVFM state for memory 114 that is output as memory DVFM state 195. The memory DVFM state 195 causes a change from the first DVFM state of memory 114 to the second DVFM state of memory 114. DPE 150 can base a subsequent memory power measurement on the second DVFM state of memory 114 in a subsequent monitoring period. Method 300 proceeds to method 330 of FIG. 3B.

Figure 3B:
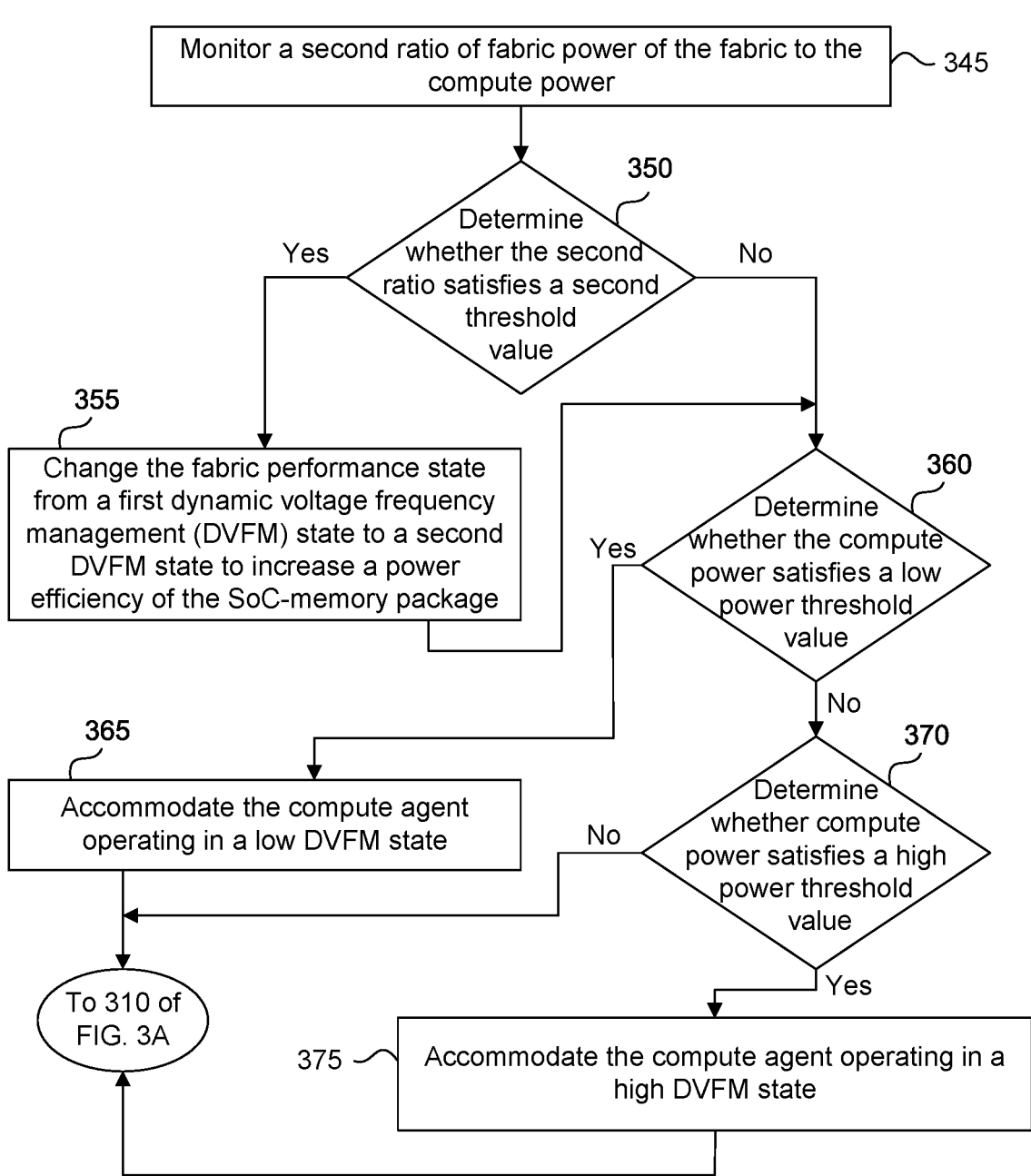
FIG. 3B illustrates another example method for memory hierarchy power management, according to some embodiments of the disclosure.

FIG. 3B illustrates example method 330 for memory hierarchy power management, according to some embodiments of the disclosure. As a convenience and not a limitation, FIG. 3B may be described with reference to elements from other figures in the disclosure. For example, method 330 can be performed by performance controller 124 and/or power management controller 126 of FIGS. 1A and 1B, and perform functions resulting in example 200 of FIG. 2.

At 345, performance controller 124 can monitor a second ratio of fabric power of the fabric to the compute power of processor complex 111 of SoC-memory package 100. For example, memory hierarchy power management 160 can include fabric-compute power controller 163 that utilizes the power measurements of DPE 150 to determine a fabric-compute power ratio. For example, a fabric-compute power ratio can be calculated as (fabric power of fabric 104)/(compute power of processor complex 111.)

At 350, performance controller 124 can determine whether the second ratio satisfies a second threshold value. For example, fabric-compute power controller 163 can compare the fabric-compute power ratio against a threshold value, and based on the comparison, determine how to manage a DVFM state of fabric 104. When the second ratio satisfies (e.g., exceeds) the second threshold value, method 330 proceeds to 355. Otherwise, method 330 proceeds to 360.

At 355, performance controller 124 and power manager 126 can change the fabric performance state from a first DVFM state to a second DVFM state to increase a power efficiency of the SoC-memory package 100. The first DVFM state and the lower DVFM state can be different than the first DVFM state and the lower DVFM state of the memory 114 discussed with respect to FIG. 3A. For example, fabric-compute power controller 163 may transmit a signal to fabric power map 165 to change from a current DVFM state to a lower DVFM state. Fabric power map 165 may select a lower DVFM state for fabric 104 accordingly. Thus, the output of fabric power map 165 can be fabric changed state 167 that includes the lower DVFM state of fabric 104.

To improve the power efficiency of SoC-memory package 100, performance controller 124 can collect the output of function 161 and the fabric changed state 167 (output of fabric power map 165) at function 169 (a minimum function). Function 169 can select the minimum DVFM state and output the selection as fabric state floor when CPU-P is active 136. Similarly, performance controller 124 can collect the output of function 162 and the fabric changed state 167 (output of fabric power map 165) at function 168 (a minimum function) and a selection can be made for CPU clusters with E-cores, output as fabric state floor when CPU-E is active 138.

Power manager controller 126 can receive the outputs from the various minimum functions of performance controller 124 that make requests regarding fabric 104, and can select an appropriate second DVFM state for fabric 104 that is output as fabric DVFM state 190. Fabric DVFM state 190 causes a corresponding change in the DVFM state of fabric 104 from the first DVFM state to the second DVFM state of fabric 104, based on the values determined by power manager controller 126. DPE 150 can base a subsequent fabric power measurement on the second DVFM state of fabric 104 in a subsequent monitoring period. The Method 330 proceeds to 360.

At 360, performance controller 124 can determine whether the compute power satisfies a low power threshold value (e.g., a low DVFM state.) For example, in a subsequent monitoring period to operations at 310 of FIG. 3A and/or operation 345, DPE 150 can determine a compute power of processor complex 111, and that processor complex 111 is operating with low compute agent power (e.g., in at least a given low DVFM state). Based on the comparison of the compute power with the low power threshold value, performance controller 124 may enable the current memory hierarchy performance (e.g., the first or second DVFM state of memory 114 and/or the first or second DVFM state of fabric 104) to be adjusted (e.g., increased) to support processor complex 111 performance. In other words, the functions or results of fabric-compute power controller 163 and/or memory-compute power controller 173 may not be employed. When the compute power satisfies a low power threshold value, method 330 proceeds to 365. Otherwise, method 330 proceeds to 370.

At 365, performance controller 124 and power manager 126 can accommodate the compute agent operating in a low DVFM state. For example, performance controller 124 can disregard the functions of memory-hierarchy power management 160. In other words, performance controller 124 may disregard the results of fabric-compute power controller 163 and/or memory-compute power controller 173. Thus, the outputs from the maximum functions (e.g., functions 161, 162, 171, 172) are input to power manager controller 126. Accordingly, the DVFM states of fabric 104 and/or memory 114 can adjust (e.g., increase) to a level higher than the respective current DVFM states (e.g., first or second DVFM states of fabric 104 and/or first or second DVFM states of memory 114), reducing the number of memory stall cycles that processor complex 111 experiences Method 330 can return to 310 of FIG. 3A.

At 370, performance controller 124 can determine whether the compute agent satisfies a high power threshold value (e.g., a high DVFM state.) For example, in a subsequent monitoring period to operations at 310 of FIG. 3A and/or operation 345, DPE 150 can determine a compute power of processor complex 111, and determine that processor complex 111 operates with high compute agent power (e.g., in at least a given high DVFM state.) Based on the comparison of the compute power with the high power threshold value, performance controller 124 may enable the memory hierarchy performance (e.g., the first or second DVFM state of memory 114 and/or the first or second DVFM state of fabric 104) to be adjusted (e.g., increased) to support processor complex 111 performance. In other words, the functions or results of fabric-compute power controller 163 and/or memory-compute power controller 173 may not be employed. When the compute agent operates in at least the high DVFM state, method 330 proceeds to 375. Otherwise, method 330 can return to 310 of FIG. 3A.

At 375, performance controller 124 and power manager 126 can accommodate the compute agent operating in a high DVFM state. For example, performance controller 124 can disregard the functions of memory-hierarchy power management 160. In other words, performance controller 124 may disregard the results of fabric-compute power controller 163 and/or memory-compute power controller 173. Thus, fabric changed state 167 does not include any changes for the DVFM state of fabric 104, and memory changed state 177 does not include any changes for the DVFM state of memory 114.

Performance controller 124 can adjust the memory-hierarchy performance state to accommodate the compute agent operating in the high DVFM state. The outputs from the maximum functions (e.g., functions 161, 162, 171, 172) are input to power manager controller 126. Accordingly, the DVFM states of fabric 104 and/or memory 114 can increase to a level higher than the respective current DVFM states (e.g., first or second DVFM states of fabric 104 and/or first or second DVFM states of memory 114), reducing the number of memory stall cycles that processor complex 111 experiences. Method 330 can return to 310 of FIG. 3A.

Figure 4:
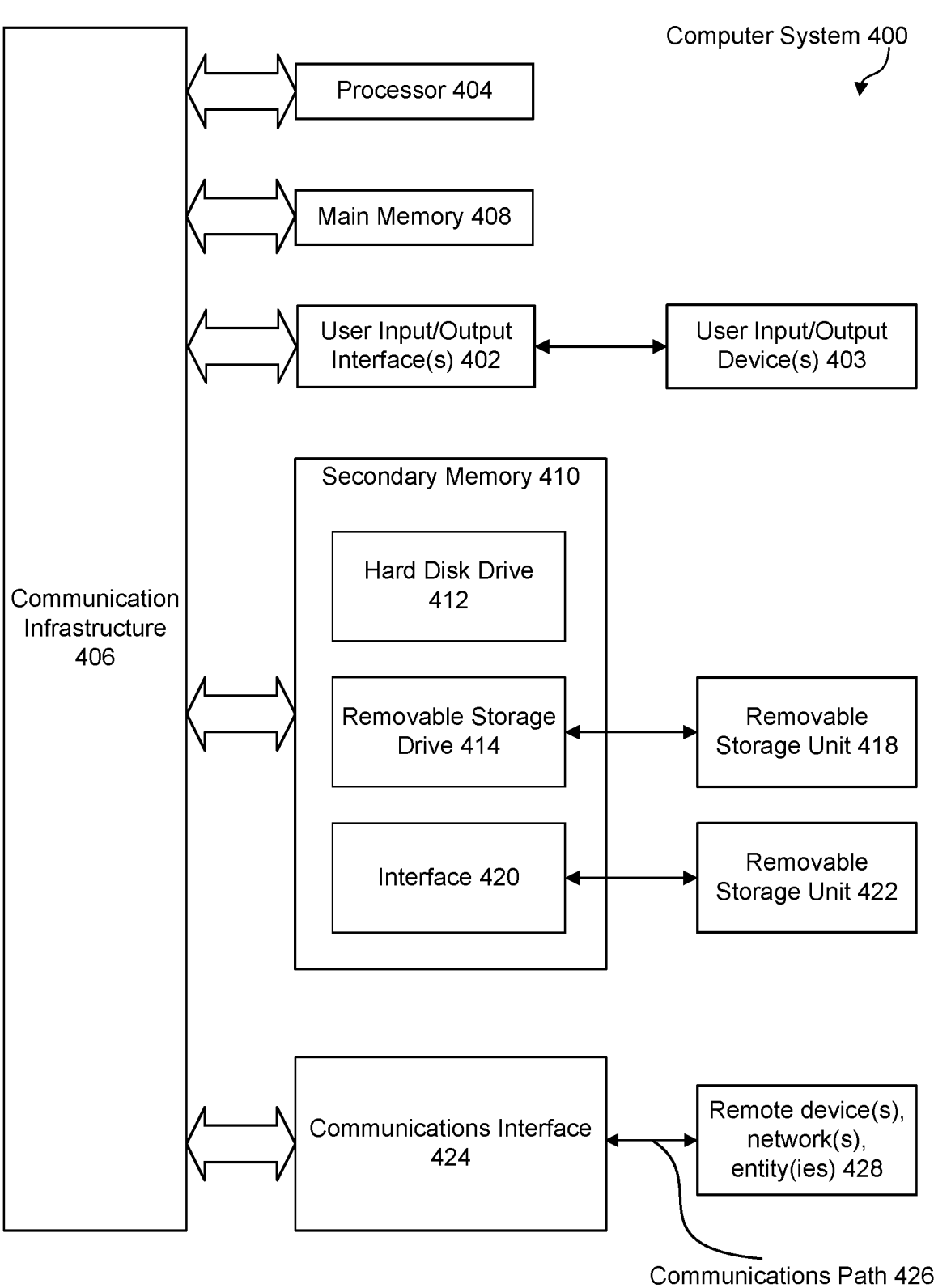
FIG. 4 is an example computer system for implementing some embodiments or portion(s) thereof.

Various embodiments can be implemented, for example, using one or more well-known computer systems, such as computer system 400 shown in FIG. 4. Computer system 400 can be any well-known computer capable of performing the functions described herein. For example, and without limitation, computer system 400 may include SoC-memory package 100, may perform functions described in: FIGS. 1A, 1B, FIG. 2, and can perform methods 300 and 330 of FIG. 3A and FIG. 3B respectively. For example, the functionality of performance controller 124 and power manager controller 126 can be performed by system 400. Other apparatuses and/or components shown in the figures may be implemented using computer system 400, or portions thereof.

Computer system 400 includes one or more processors (also called central processing units, or CPUs), such as a processor 404. Processor 404 is connected to a communication infrastructure 406 that can be a bus. One or more processors 404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402. Computer system 400 also includes a main or primary memory 408, such as random access memory (RAM). Main memory 408 may include one or more levels of cache. Main memory 408 has stored therein control logic (e.g., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to some embodiments, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 400, main memory 408, secondary memory 410 and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 4. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A method for operating a systems-on-a-chip (SoC)-memory package comprising a compute agent, a memory, and a fabric interconnecting the compute agent and the memory, the method comprising:

monitoring a first ratio determined by a memory power of the memory divided by a compute power of the compute agent;

determining that the first ratio satisfies a first threshold value; and subsequent to the determination that the first ratio satisfies the first threshold value, changing a memory performance state from a first memory dynamic voltage frequency management (DVFM) state to a second memory DVFM state, wherein the compute agent experiences an increase in a number of memory stall cycles based at least on the second memory DVFM state, and wherein the changing the memory performance state increases a power efficiency of the SoC-memory package.

2. The method of claim 1, further comprising:

determining whether the compute power satisfies a first low power threshold value; and based at least on the determination with the first low power threshold, changing the memory performance state from the second memory DVFM state to a third memory DVFM state, wherein the compute agent experiences a decrease in the number of memory stall cycles based at least on the third memory DVFM state.

3. The method of claim 1, further comprising:

determining whether the compute power satisfies a first high power threshold value; and based at least on the determination with the first high power threshold value, change the memory performance state from the second memory DVFM state to a third memory DVFM state, wherein the compute agent experiences a decrease in the number of memory stall cycles based at least on the third memory DVFM state.

4. The method of claim 1, wherein the monitoring is periodic and comprises a digital power estimation of: the memory power, the compute power, or a fabric power of the fabric.

5. The method of claim 1, further comprising:

monitoring a second ratio determined by a fabric power of the fabric divided by the compute power;

determining that the second ratio satisfies a second threshold value; and subsequent to the determination that the second ratio satisfies the second threshold value, changing a fabric performance state from a first fabric DVFM state to a second fabric DVFM state, wherein the compute agent experiences an increase in the number of memory stall cycles based at least on the second fabric DVFM state, and wherein the changing the fabric performance state increases the power efficiency of the SoC memory package.

6. The method of claim 1, wherein the second memory DVFM state is a lower DVFM state than the first memory DVFM state.

7. The method of claim 1, wherein the second memory DVFM state corresponds to a lower power level and a lower performance level than the first memory DVFM state.

8. A non-transitory computer-readable medium storing instructions that, upon execution by one or more processors of a systems-on-a-chip (SoC)-memory package comprising the one or more processors, a memory, and a fabric interconnecting the one or more processors and the memory, cause the SoC-memory package to perform operations, the operations comprising:

monitoring a first ratio determined by a memory power of the memory divided by a compute power of the one or more processors;

determining that the first ratio satisfies a first threshold value; and subsequent to the determining the first ratio, changing a memory performance state from a first memory dynamic voltage frequency management (DVFM) state to a second memory DVFM state, wherein the one or more processors experience an increase in a number of memory stall cycles based at least on the second memory DVFM state, and wherein the changing the memory performance state increases a power efficiency of the SoC-memory package.

9. The non-transitory computer-readable medium of claim 8, wherein the operations further comprise:

determining whether the compute power satisfies a first low power threshold value; and based at least on the determination with the first low power threshold, changing the memory performance state from the second memory DVFM state to a third memory DVFM state, wherein the one or more processors experience a decrease in the number of memory stall cycles based at least on the third memory DVFM state.

10. The non-transitory computer-readable medium of claim 8, wherein the operations further comprise:

determining whether the compute power satisfies a first high power threshold value; and based at least on the determination with the first high power threshold value, enable a change of the memory performance state from the second memory DVFM state to a third memory DVFM state, wherein the one or more processors experience a decrease in the number of memory stall cycles based at least on the third memory DVFM state.

11. The non-transitory computer-readable medium of claim 8, wherein the changing occurs in a closed loop system and wherein the monitoring is periodic and comprises a digital power estimation of: the memory power, the compute power, or a fabric power of the fabric.

12. The non-transitory computer-readable medium of claim 8, further comprising:

monitoring a second ratio determined by a fabric power of the fabric divided by the compute power;

determining that the second ratio satisfies a second threshold value; and subsequent to determining the second ratio, changing a fabric performance state from a first fabric DVFM state to a second fabric DVFM state, wherein the one or more processors experience an increase in the number of memory stall cycles based at least on the second fabric DVFM state, and wherein the changing the fabric performance state increases the power efficiency of the SoC memory package.

13. The non-transitory computer-readable medium of claim 12, further comprising:

determining whether the compute power satisfies a second low power threshold value; and based at least on the determination with the second low power threshold, changing the fabric performance state from the second fabric performance DVFM state to a third fabric DVFM state, wherein the one or more processors experience a decrease in the number of memory stall cycles based at least on the third fabric DVFM state.

14. The non-transitory computer-readable medium of claim 12, further comprising:

determining whether the compute power satisfies a second high power threshold; and based at least on the determination with the second high power threshold value, changing the fabric performance state from the second fabric performance DVFM state to a third fabric DVFM state, wherein the one or more processors experience a decrease in the number of memory stall cycles based at least on the third fabric DVFM state.

15. A systems-on-a-chip (SoC)-memory package comprising:

a memory; and one or more processors communicatively coupled to the memory via a fabric, wherein the one or more processors are configured to:

monitor a first ratio determined by a memory power of the memory divided by a compute power of the one or more processors;

determine that the first ratio satisfies a first threshold value; and subsequent to the determination that the first ratio satisfies the first threshold value, change a memory performance state from a first memory dynamic voltage frequency management (DVFM) state to a second memory DVFM state, wherein the one or more processors experience an increase in a number of memory stall cycles based at least on the second memory DVFM state, and wherein the changing the memory performance state increases a power efficiency of the SoC-memory package.

16. The SoC-memory package of claim 15, wherein the one or more processors are further configured to:

determine whether the compute power satisfies a first low power threshold value; and based at least on the determination with the first low power threshold, change the memory performance state from the second memory DVFM state to a third memory DVFM state, wherein the one or more processors experience a decrease in the number of memory stall cycles based at least on the third memory DVFM state.

17. The SoC-memory package of claim 15, wherein the one or more processors are further configured to:

determine whether the compute power satisfies a first high power threshold value; and based at least on the determination with the first high power threshold value, change the memory performance state from the second memory DVFM state to a third memory DVFM state, wherein the one or more processors experience a decrease in the number of memory stall cycles based at least on the third memory DVFM state.

18. The SoC-memory package of claim 15, wherein the one or more processors are further configured to:

monitor a second ratio determined by a fabric power of the fabric divided by the compute power;

determine that the second ratio satisfies a second threshold value; and subsequent to determining the second ratio, change a fabric performance state from a first fabric DVFM state to a second fabric DVFM state, wherein the one or more processors experience an increase in the number of memory stall cycles based at least on the second fabric DVFM state, and wherein the changing the fabric performance state increases the power efficiency of the SoC memory package.

19. The SoC-memory package of claim 18, wherein the one or more processors are further configured to:

determine whether the compute power satisfies a second low power threshold value; and based at least on the determination with the second low power threshold, change the fabric performance state from the second fabric performance DVFM state to a third fabric DVFM state, wherein the one or more processors experience a decrease in the number of memory stall cycles based at least on the third fabric DVFM state.

20. The SoC-memory package of claim 18, wherein the one or more processors are further configured to:

determine whether the compute power satisfies a second high power threshold; and based at least on the determination with the second high power threshold value, change the fabric performance state from the second fabric performance DVFM state to a third fabric DVFM state, wherein the one or more processors experience a decrease in the number of memory stall cycles based at least on the third fabric DVFM state.

\* \* \* \* \*